US012698403B2

(12) United States Patent
Tyebjee et al.

(10) Patent No.: US 12,698,403 B2
(45) Date of Patent: *Aug. 4, 2026

(54) ADHESION PROMOTING COMPOSITIONS AND METHOD OF IMPROVING FUEL RESISTANCE OF A COATED ARTICLE

(71) Applicant: PPG INDUSTRIES OHIO, INC., Cleveland, OH (US)

(72) Inventors: Shiryn Tyebjee, Tarentum, PA (US); Hongying Zhou, Allison Park, PA (US); Christopher A. Verardi, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 186 days.

This patent is subject to a terminal disclaimer.

(21) Appl. No.: 18/529,391

(22) Filed: Dec. 5, 2023

(65) Prior Publication Data

US 2024/0101832 A1 Mar. 28, 2024

Related U.S. Application Data

(63) Continuation of application No. 17/432,086, filed as application No. PCT/US2020/014368 on Jan. 21, 2020, now Pat. No. 11,884,840, which is a continuation of application No. 16/278,770, filed on Feb. 19, 2019, now abandoned.

(51) Int. Cl.

*C09D 5/00* (2006.01)
*C08J 7/04* (2020.01)
*C09D 123/30* (2006.01)

(52) U.S. Cl.

CPC .............. *C09D 5/002* (2013.01); *C08J 7/042* (2013.01); *C09D 123/30* (2013.01); *C08J 2323/02* (2013.01); *C08J 2423/30* (2013.01); *C08J 2445/00* (2013.01); *C08J 2467/08* (2013.01)

(58) Field of Classification Search

CPC .................................................... C09D 123/30
See application file for complete search history.

(56) References Cited

U.S. PATENT DOCUMENTS

| | | | |
|---|---|---|---|
| 4,997,882 A | 3/1991 | Martz et al. | |
| 5,264,476 A | 11/1993 | Daimon et al. | |
| 5,863,646 A | 1/1999 | Verardi et al. | |
| 6,203,913 B1 | 3/2001 | Kondos et al. | |
| 6,593,423 B1 * | 7/2003 | Kondos | C08J 7/0427 525/227 |
| 9,006,334 B2 | 4/2015 | Hashimoto et al. | |
| 9,593,423 B2 | 3/2017 | Mori et al. | |
| 9,631,111 B2 | 4/2017 | Lee et al. | |
| 11,884,840 B2 * | 1/2024 | Tyebjee | C08J 7/042 |
| 2003/0055163 A1 | 3/2003 | Urata et al. | |
| 2006/0003114 A1 | 1/2006 | Enlow et al. | |
| 2011/0059244 A1 | 3/2011 | December et al. | |
| 2016/0115334 A1 | 4/2016 | Kawabe et al. | |
| 2019/0382611 A1 | 12/2019 | Yamasaki et al. | |

FOREIGN PATENT DOCUMENTS

| | | | |
|---|---|---|---|
| BR | 10411249 | A | 7/2006 |
| CN | 102796342 | A | 11/2012 |
| RU | 2612846 | C2 | 3/2017 |
| WO | WO-0183628 | A3 | 11/2001 |
| WO | WO-2018135418 | | 7/2018 |

OTHER PUBLICATIONS

Product Information of Toyobo Hardlen CY-9122P and CY-9124P (Year 2015).

Kevin A . Williams, "An Adhesion Promoting Agent which Includes a Graft Copolymer Formed by a Halogenated Polyolefin Polymer With at Least One Reactive Functionality and a Substantially Saturated Hydrocarbon Polymer Having More than One Reactive Functionality", International Coatings for Plastics Symposium, Jun. 9-11, 2003.

* cited by examiner

*Primary Examiner* — Vu A Nguyen

(57) ABSTRACT

The present invention is directed to film-forming compositions comprising: a) a non-chlorinated, linear polyolefin polymer comprising 0.5 to 10 percent by weight residues of an ethylenically unsaturated anhydride or acid; b) an aminoplast; and c) a component comprising: i) at least one non-chlorinated hydrocarbon having at least 18 carbon atoms and optionally aromatic groups and/or oxygen heteroatoms; and/or ii) an alkyd resin. The present invention is also drawn to methods of improving fuel resistance of a coated article, comprising: (1) applying the film-forming composition to a substrate to form a coated substrate; (2) optionally subjecting the coated substrate to a temperature for a time sufficient to cure the film-forming composition; (3) applying at least one curable film-forming composition to the coated substrate to form a multi-layer coated substrate; and (4) subjecting the multi-layer coated substrate to a temperature and for a time sufficient to cure all of the film-forming compositions.

19 Claims, No Drawings

ADHESION PROMOTING COMPOSITIONS AND METHOD OF IMPROVING FUEL RESISTANCE OF A COATED ARTICLE

CROSS REFERENCE TO RELATED APPLICATIONS

This application is a continuation of U.S. patent application Ser. No. 17/432,086, which has a 371 date of Aug. 18, 2021, and is titled "ADHESION PROMOTING COMPOSITIONS AND METHOD OF IMPROVING FUEL RESISTANCE OF A COATED ARTICLE", and which is a national stage filing of PCT/US2020/014368, filed Jan. 21, 2020, and titled "ADHESION PROMOTING COMPOSITIONS AND METHOD OF IMPROVING FUEL RESISTANCE OF A COATED ARTICLE", which in turn is a continuation of U.S. patent application Ser. No. 16/278,770, filed Feb. 19, 2019, and titled "ADHESION PROMOTING COMPOSITIONS AND METHOD OF IMPROVING FUEL RESISTANCE OF A COATED ARTICLE", now abandoned, all of which are incorporated herein by reference in their entireties.

FIELD OF THE INVENTION

The present invention relates to adhesion promoting compositions and methods of improving fuel resistance of coated articles.

BACKGROUND OF THE INVENTION

Polymeric materials, such as thermoplastic polyolefin (TPO) and reaction injected molding urethane (RIM), are useful in many applications, such as automobile parts and accessories, containers, household appliances and other commercial items. Such polymeric materials are often used as substrates with organic coating compositions applied for aesthetic purposes or to protect them from degradation when exposed to atmospheric weathering conditions such as sunlight, moisture, heat and cold. To achieve longer lasting and more durable parts, it is important for the coatings to be firmly adhered to the surface of the article.

Polymeric substrates made from a variety of thermoplastic and thermosetting materials have widely varying surface properties, including surface tension, roughness and flexibility, which make strong adhesion of organic coatings difficult, particularly after aging or environmental exposure of the coated polymeric materials. To facilitate adhesion of organic coatings to polymeric substrates, the substrate can be pretreated using an adhesion promoter layer or tie coat, e.g., a thin coating layer about 0.25 mils (6.35 microns) thick, or by flame or corona pretreatment. For automotive applications, it is important that the coating composition and/or adhesion promoter layer is resistant to fuel damage, i.e. maintains good adhesion of the coating to the substrate even if fuel is accidentally spilled onto the coated substrate.

Typically, adhesion promoter layers used on TPO surfaces contain chlorinated polyolefins. Liquid adhesion promoting coating compositions containing polyolefin diols or a blend of a saturated polyhydroxylated polydiene polymer and a chlorinated polyolefin have also been developed. However, chlorinated polyolefins provide some processing limitations. For example, conventional chlorinated polyolefins typically have no curing or crosslinking sites and therefore must be used at high molecular weights to have a positive effect on coating strength.

Additionally, while these known adhesion promoting compositions are generally acceptable for commercial applications, they tend to either have good adhesion to polymeric substrates with poor to moderate fuel resistance; or good adhesion and good fuel resistance but only with a small variety of polymeric substrate types or only at high levels of chlorinated polyolefin, resulting in high VOC. It would be desirable to provide compositions useful as adhesion promoters and service primers for automotive topcoats on plastic substrates, further demonstrating improved fuel resistance, in order to meet the new demands in automotive manufacturing such as elimination of primers.

SUMMARY OF THE INVENTION

The present invention is directed to film-forming compositions comprising:

A) a non-chlorinated, linear polyolefin polymer comprising 0.5 to 10 percent by weight residues of an ethylenically unsaturated anhydride and/or acid, based on the total weight of the linear polyolefin polymer;

B) an aminoplast; and

C) a component comprising:

i) at least one non-chlorinated hydrocarbon having at least 18 carbon atoms and which may include aromatic groups and/or oxygen heteroatoms, having a number average molecular weight of 200 to 2500; and/or ii) an alkyd resin that is different from the component C) i). The compositions are useful as adhesion promoters.

The present invention is also drawn to methods of improving fuel resistance of a coated article, comprising:

(1) applying the film-forming composition described above and herein to at least a portion of a substrate to form a coated substrate;

(2) optionally subjecting the coated substrate formed in step (1) to a temperature for a time sufficient to cure the film-forming composition;

(3) applying at least one curable film-forming composition to at least a portion of the coated substrate formed in step (1) to form a multi-layer coated substrate; and (4) subjecting the multi-layer coated substrate formed in step (3) to a temperature for a time sufficient to cure all of the curable film-forming compositions.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion, such as at least 10 percent, or at least 20 percent, of the reactive groups of the composition occurs, to form a polymerizate. The polymerizable composition can also be subjected to curing conditions such that a substantially complete cure is attained (such as at least 70 percent, or at least 80 percent, or at least 90 percent up to 100 percent, of the reactive groups react) and wherein further curing results in no significant further improvement in polymer properties, such as hardness.

The various embodiments and examples of the present invention as presented herein are each understood to be non-limiting with respect to the scope of the invention.

The film-forming composition of the present invention comprises A) a non-chlorinated, linear polyolefin polymer that may be prepared from a reaction mixture comprising an ethylenically unsaturated acid or anhydride, such that the resulting linear polyolefin polymer comprises 0.5 to 10 percent by weight residues of the ethylenically unsaturated anhydride or acid, based on the total weight of the linear polyolefin polymer. For example, the residues may be present in the linear polyolefin polymer in an amount of at least 0.5 percent by weight, or at least 1 percent by weight, or at least 2 percent by weight; and in an amount of at most 10 percent by weight, or at most 7 percent by weight, or at most 5 percent by weight. By "residue" is meant a moiety that is present in a reaction product (such as a polymer), formed by a particular reactant (such as a monomer) during reaction (e.g., polymerization). Suitable ethylenically unsaturated anhydrides and acids may include one or more of maleic anhydride, monocarboxylic acids such as acrylic acid, methacrylic acid, crotonic acid; dicarboxylic acids such as itaconic acid, maleic acid and fumaric acid. The reaction mixture used to prepare the linear polyolefin polymer A) may further comprise ethylene and/or propylene. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C. The polyolefin polymers may comprise polyethylene, polypropylene, polymethylpentene, polybutene-1, polyisobutylene, and the like. The polyolefin may also be a copolymer of different olefinic monomers with other optional ethylenically unsaturated monomers. In a particular example of the present invention, the linear polyolefin polymers often comprise polyethylene, or more often polypropylene, and at least 0.5 percent by weight, or at least 1 percent by weight, or at least 2 percent by weight, and up to 10 percent by weight, such as up to 7 percent by weight, or up to 5 percent by weight, or up to 4 percent by weight, or up to 3 percent by weight maleic anhydride residues, based on the total weight of the linear polyolefin. Examples include the linear polyolefins TOYO-TAC, available from TOYOBO CO., LTD.

The linear polyolefin polymers may be prepared so as to have (i) additional functional groups comprising ester and/or urethane groups and/or (ii) additional reactive groups comprising hydroxyl, epoxy, and/or siloxane groups. The reactive groups on these polyolefins may then be further reacted with a polyfunctional material, a lactone, or a lactide to yield a non-chlorinated, reactive polyolefin having (i) functional groups comprising ester and/or urethane groups and (ii) reactive groups comprising hydroxyl, epoxy, and/or siloxane groups.

Examples of polyfunctional materials include diepoxides or higher polyepoxides. Use of a diepoxide as a difunctional material allows for bridging between polyolefins that contain acid functional groups. Other polyfunctional materials are epoxy functional alkoxysilanes such as SILQUEST® A-187, commercially available from Momentive Performance Materials; and isocyanate functional alkoxysilanes, such as SILQUEST® A-link 35, an isocyanatopropyl trimethoxy silane, and SILQUEST® A-link 25, an isocyanatopropyl triethoxy silane, both commercially available from Momentive Performance Materials.

In certain examples of the present invention, the linear polyolefin polymer is further reacted with a polyepoxide and a monohydric alcohol. Examples of suitable monohydric alcohols include n-propanol, isopropanol, n-butanol, and/or isobutanol.

In other examples of the present invention, the reaction mixture used to prepare the linear polyolefin polymer A) further comprises an ethylenically unsaturated monomer comprising at least one (meth)acrylic monomer, including any of those known in the art. The terms "(meth)acrylic", "(meth)acrylate" and the like are meant to encompass acrylate and/or methacrylate molecular structures where they exist. Examples of suitable polyolefin polymers prepared in this manner are commercially available as AUROREN, from Nippon Paper.

Each of the linear polyolefin polymers described above may be used individually or in any combination with each other in the film-forming composition.

The linear polyolefin polymer A), including any modifications described above, may be present in the film-forming composition in an amount of at least 5 percent by weight, or at least 10 percent by weight, or at least 15 percent by weight, and up to 40 percent by weight, such as up to 30 percent by weight, or up to 20 percent by weight, based on the total weight of resin solids in the film-forming composition.

In certain examples of the present invention, the linear polyolefin polymer A) may be dispersed with a polyepoxide and a monohydric alcohol in an organic medium. Suitable organic media include xylene, AROMATIC 100 (CAS No. 64742-95-6, a blend of $C_{9-10}$ dialkyl- and trialkylbenzenes, available from ExxonMobil), cyclohexane, and butyl acetate. The polyepoxide may be a di- or higher polyepoxide; for example, a diepoxide, such as EPONEX 1510, commercially available from Hexion, can be used. Examples of suitable monohydric alcohols include any of those disclosed above. In this example, the polyepoxide may be present in the film-forming composition in an amount of at least 0.01 percent by weight, or at least 0.10 percent by weight, or at least 0.50 percent by weight, and up to 15.00 percent by weight, such as up to 10.00 percent by weight, or up to 5.00 percent by weight, or up to 1.00 percent by weight, based on the total weight of resin solids in the film-forming composition. The monohydric alcohol may be present in the film-forming composition in an amount of at least 0.10 percent by weight, or at least 1.00 percent by weight, or at least 5.00 percent by weight, and up to 20.00 percent by weight, such as up to 16.00 percent by weight, or up to 8.00 percent by weight, based on the total weight of resin solids in the film-forming composition.

The film-forming composition of the present invention further comprises B) an aminoplast. Useful aminoplast resins are addition products of formaldehyde with an amino- or amido-group carrying substance. Condensation products obtained from the reaction of alcohols and formaldehyde with melamine, urea or benzoguanamine are most common. While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol. Carbamoyl triazines of the formula $C_3N_3(NHCOXR)_3$ where X is —NH—, oxygen or —$CH_2$— and R is a lower alkyl group having from one to twelve carbon atoms or mixtures of lower alkyl groups, such as methyl, ethyl, propyl, butyl, n-octyl, and 2-ethylhexyl, are also suitable. Such compounds and their preparation are described in detail in U.S. Pat. No. 5,084,541 (column 2, line 50 through column 7, line 63).

Imino groups and amino groups on an aminoplast resin arise from the incomplete reaction of the aldehyde with the amine. Aminoplast resins are characterized as low-imino if the imino content is less than about 10%; that is, if less than about 10% of the functional groups on the resin consist of imino or amino groups as determined by NMR analysis. Commonly, low-imino aminoplast resins contain less than 5% imino content. On the other hand, if the imino content of an aminoplast resin is greater than about 10%, it can be characterized as high-imino. More commonly, the imino content of a high imino resin is 15% or higher. Commercial high imino melamine resins, for example, are available with up to about 35% imino content. Typically the aminoplast is at least partially alkylated and 10 to 35 percent, usually 15 to 35 percent, of functional groups on the aminoplast comprise imino groups. A particularly useful aminoplast is CYMEL 1158, available from Allnex.

The aminoplast B) may be present in the film-forming composition in an amount of at least 5 percent by weight, or at least 7 percent by weight, or at least 10 percent by weight, and up to 20 percent by weight, such as up to 17 percent by weight, or up to 15 percent by weight, based on the total weight of resin solids in the film-forming composition.

The film-forming composition of the present invention further comprises C) a component comprising i) at least one non-chlorinated hydrocarbon having at least 18 carbon atoms and which may include aromatic groups and/or oxygen heteroatoms, having a number average molecular weight of 200 to 2500; and/or ii) an alkyd resin that is different from the component C) i). Though not intending to be bound by theory, it is believed that the component C) may provide fuel resistance to the curable film-forming composition by increasing compatibility among the various components of the film-forming composition, particularly when the curable film-forming composition is applied to a polymeric substrate. When the non-chlorinated hydrocarbon i) includes oxygen as a heteroatom, the oxygen may be present in an amount of 0 to 20 percent by weight, such as at least 1 percent by weight, or at least 3 percent by weight, and at most 17 percent by weight, or at most 10 percent by weight, or at most 5 percent by weight, based on the total weight of the non-chlorinated hydrocarbon i).

The non-chlorinated hydrocarbon i) may comprise a) an addition polymer prepared from 1) coumarone and/or indene, and 2) at least one of styrene, alpha-methyl styrene, m-methyl styrene, and p-methyl styrene. For example, the non-chlorinated hydrocarbon i) may be prepared from a reaction mixture comprising coumarone and indene, and often additionally styrene. These addition polymers are particularly suitable for use in film-forming compositions containing yellow or dark colorants, or when subsequently applied coating layers contain yellow or dark colorants. Dark colorants include black, dark gray, navy blue, and the like. Such addition polymers are commercially available from Nitto Chemical as COUMARONE V-1205 and from Neville Chemical Co. as CUMAR 130. Other suitable addition polymers include NOVARES TN150, available from Rain Carbon, Inc., Rütgers Chemicals.

The non-chlorinated hydrocarbon i) may additionally or alternatively comprise b) a hydroxyl functional, branched polyolefin polymer, often referred to as a polyolefin "oil" or "wax". Examples include polyolefins comprising polyethylene, polypropylene, polymethylpentene, polybutene-1, polyisobutylene, and the like. The polyolefin may also be a copolymer of different olefinic monomers with other optional ethylenically unsaturated monomers. Examples of suitable branched polyolefins include the hydroxyl functional VYBAR H-6164 and VYBAR H-6175, available from Baker Hughes, Inc.

The non-chlorinated hydrocarbon i) may additionally or alternatively comprise c) a polyterpene polymer. Commercial examples include those sold under the WINGTACK line, such as WINGTACK 86, available from Cray Valley, Total Petrochemicals and Refining USA, Inc.

The non-chlorinated hydrocarbon i) may additionally or alternatively comprise d) a fatty acid oil. Examples include coconut oil, fish oil, linseed oil, tung oil, castor oil, cottonseed oil, safflower oil, soybean oil, tall oil, tung oil, and the like. The non-chlorinated hydrocarbons b), c), and d) are resistant to yellowing and are particularly suitable for use in film-forming compositions containing light colorants such as white pigments or other light colored pigments, or when subsequently applied coating layers contain light colorants, where yellowing would be aesthetically detrimental.

The component C) in the film-forming composition of the present invention may additionally or alternatively comprise ii) an alkyd resin that is different from the component C) i). Suitable alkyd resins may be prepared in a known manner by condensation of polyhydric alcohols and polycarboxylic acids including fatty acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid, as well as fatty acids, for example, those derived from linseed oil, soya bean oil, tall oil, dehydrated castor oil, or tung oil. Besides the polycarboxylic acids mentioned above, functional equivalents of the acids such as anhydrides where they exist or lower alkyl esters of the acids such as the methyl esters may be used. A particularly suitable alkyd resin may be modified with at least one (meth)acrylic monomer to provide an alkyd-acrylic polymer, as illustrated in the Examples below. Often, both the non-chlorinated hydrocarbon i) and the alkyd resin ii) are present in the component C) of the film-forming composition.

The weight ratio of the linear polyolefin polymer A) to the component C) in the curable film-forming composition may range from 5:95 to 1:1. For example, the weight ratio of the linear polyolefin polymer A) to the component C) in the curable film-forming composition may range from 1, or 5, or 10, or 20, or 30, or 40:95, or 85, or 75, or 65, or 60, or 50.

Often the film-forming composition of the present invention further comprises D) a hydroxyl functional (meth) acrylic polymer, a hydroxyl functional polyester polymer, an acid functional (meth)acrylic polymer, and/or an acid functional polyester polymer. Any of the polymers may have either one or both acid and hydroxyl functional groups. By “polymer” is meant a polymer including homopolymers and copolymers, and oligomers.

Useful hydroxyl functional ethylenically unsaturated monomers used to prepare hydroxyl functional (meth) acrylic polymers include hydroxyalkyl (meth)acrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone and hydroxyalkyl (meth) acrylates, as well as the beta-hydroxy ester functional monomers described below.

One or more other polymerizable ethylenically unsaturated monomers as known in the art may be included in the reaction mixture that may be used to prepare the hydroxyl functional (meth)acrylic polymer, including, for example, aliphatic and/or aromatic alkyl esters of acrylic acid and/or methacrylic acid containing from 1 to 30, and usually 4 to 18 carbon atoms in the alkyl group. Non-limiting examples include methyl methacrylate, ethyl methacrylate, butyl methacrylate, ethyl acrylate, butyl acrylate, isobornyl (meth) acrylate and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

A particularly suitable hydroxyl functional (meth)acrylic polymer may be prepared as demonstrated in the Examples below. The hydroxyl functional (meth)acrylic polymer may be prepared using known addition polymerization techniques, such as organic solution polymerization techniques, in particular from the afore-mentioned reaction mixtures.

Hydroxyl functional polyester polymers may also or alternatively be used as the component D). Such polymers may be prepared in a known manner by condensation of polyhydric alcohols and polycarboxylic acids listed below. The polyhydric alcohol is used in stoichiometric excess relative to the polycarboxylic acid to ensure hydroxyl functional groups on the resultant polyester polymer.

The hydroxyl functional (meth)acrylic and/or polyester polymer typically has a theoretical hydroxyl number of at least 20, such as at least 40, or at least 70 to at most 200, such as at most 180, or at most 160, based on the total resin solids weight of the polymer Acid functional (meth)acrylic and/or polyester polymers may also or alternatively be used as the component D) in the film-forming composition of the present invention as noted above. The acid functional (meth)acrylic and/or polyester polymer typically has an acid value of at least 3, such as at least 5, or at least 10, or at least 15, to at most 100, such as at most 85, or at most 50, or at most 20, based on the total resin solids weight of the polymer.

Suitable acid (meth)acrylic polymers include copolymers of (meth)acrylic acid and/or other ethylenically unsaturated acid functional monomers, together with one or more alkyl esters of acrylic acid and/or methacrylic acid, and optionally one or more other polymerizable ethylenically unsaturated monomers. Useful alkyl esters of acrylic acid or methacrylic acid include any known in the art, such as those disclosed above.

The acid functional (meth)acrylic copolymer can include hydroxyl functional groups, which are often incorporated into the polymer by including one or more hydroxyl functional monomers in the reactants used to produce the copolymer. Useful hydroxyl functional monomers include the hydroxyalkyl acrylates and methacrylates described above, as well as beta-hydroxy ester functional monomers.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used as monomers or to prepare the beta-hydroxy ester functional monomers include monocarboxylic acids such as acrylic acid, methacrylic acid, crotonic acid; dicarboxylic acids such as itaconic acid, maleic acid and fumaric acid;

and monoesters of dicarboxylic acids such as monobutyl maleate and monobutyl itaconate. Such acid functional monomers are also suitable as reactants with the other ethylenically unsaturated monomers to provide acid functionality to the (meth)acrylic polymer. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

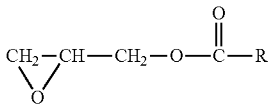

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

A suitable (meth)acrylic polymer having both acid and hydroxyl functional groups may comprise a reaction product of acrylic acid with hydroxyethyl acrylate, isobornyl acrylate, and/or methyl methacrylate. Such polymers are illustrated in the Examples of United States Patent Application Publication Number 2018/0171170.

Acrylic polymers can be prepared via organic solution polymerization techniques. Generally any method of producing such polymers that is known to those skilled in the art utilizing art recognized amounts of monomers can be used.

Acid functional polyester polymers may also or alternatively be used as the component D), and again may be prepared in a known manner by condensation of polyhydric alcohols and polycarboxylic acids. The polycarboxylic acid may be used in stoichiometric excess relative to the polyhydric alcohol to ensure acid functional groups on the resultant polyester polymer. Suitable polyhydric alcohols for the preparation of any of the polyester polymers include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Other suitable acid functional polyester polymers include phosphatized polyester polymers, such as those illustrated in the Examples of U.S. Pat. No. 5,859,154, and those commercially available as LUBRIZOL 2063 from the Lubrizol Corporation. Phosphatized polyester polymers may be prepared by including at least one salt-forming phosphorus compound, such as phosphoric acid, phosphorous acid, phosphinic acid, phosphinous acid, organic acid phosphate, phosphorous oxychloride, alkyl esters of phosphoric acid, anhydrides of phosphoric acid, hydrogen-containing salts of phosphoric acid, or hypophosphorous acid, in the reaction mixture used to prepare the polyester.

When used, the hydroxyl or acid functional (meth)acrylic and/or polyester polymers D) are present in the film-forming composition in an amount of at least 5 percent by weight, or at least 8 percent by weight, or at least 11 percent by weight, and up to 16 percent by weight, such as up to 20 percent by weight, or up to 23 percent by weight, or up to 30 percent by weight, or up to 40 percent by weight, based on the total weight of resin solids in the film-forming composition.

The film-forming compositions of the present invention may be curable when the acid functional or hydroxyl functional (meth)acrylic and/or polyester polymer D) is present and/or when the polyolefin polymer A) contains reactive functional groups that may react with the aminoplast B). Curing may be desirable when the composition is used as a service primer to prevent damage to the resulting coating during subsequent shipping. However, it is not necessary to cure the composition (i. e., subject it to its own cure regimen) when it is used as a coating immediately prior to application of any subsequent coating layers. Curing may occur when the subsequently applied layers are subjected to curing conditions. The film-forming compositions may further contain a catalyst to facilitate any desired cure. Typical catalysts include phenyl acid phosphate and sulfonic acid functional catalysts such as dodecylbenzene sulfonic acid (DDBSA) and the like. Alternatively, the film-forming compositions may be essentially free of a catalyst. As used throughout this specification, including the claims, by "essentially free" is meant that a compound is not intentionally present in the composition; and if a compound is present in the composition, it is present incidentally in an amount less than 0.1 percent by weight, usually less than trace amounts.

The film-forming compositions of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind resin vehicle, such as an acrylic grind vehicle or surfactant dispersant, the use of which will be familiar to one skilled in the art.

Example pigments and/or pigment compositions include, but are not limited to, mica, metallic pigments, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

In particular examples of the present invention, the film-forming composition further comprises a pigment colorant such as carbon black and/or $TiO_2$, each of which may or may not be conductive. Other conductive pigments such as conductive micas, silvers, and the like are also suitable. In general, the colorant can be present in the coating composition in any amount sufficient to impart the desired property, visual and/or color effect. The colorant may comprise from 1 to 90 weight percent of the present compositions, such as from 3 to 40 weight percent or 5 to 35 weight percent, with weight percent based on the total weight of the composition.

The film-forming compositions of the present invention are particularly useful as adhesion promoters for subsequently applied coating compositions on industrial substrates. In accordance with the present invention, the compositions of the present invention may be used in a method of improving fuel resistance of a coated article, such as a vehicular component. By "improving fuel resistance" is meant fuel resistance of a coated article increases when subjected to the fuel resistance test as described in footnote 22 of Table 5 below. Coated articles demonstrate improved fuel resistance when coated with the compositions of the present invention using the method of the present invention, compared to articles coated with similar compositions that do not contain an aminoplast. The method comprises: (1) applying a first film-forming composition to at least a portion of a substrate to form a coated substrate, wherein the first film-forming composition comprises any of the film-forming compositions described above; (2) optionally subjecting the coated substrate formed in step (1) to a temperature for a time sufficient to cure the film-forming composition; (3) applying at least one curable film-forming composition to at least a portion of the coated substrate formed in step (1) to form a multi-layer coated substrate; and (4) subjecting the multi-layer coated substrate formed in step (3) to a temperature for a time sufficient to cure all of the curable film-forming compositions.

The method of the present invention is particularly useful for polymeric substrates, including elastomeric, plastic, or composite substrates such as those that are found on motor vehicles and used as vehicle components such as wheels, bumpers, fenders, hoods, doors, panels, etc. These vehicle parts may be formed from any of the common thermoplastic or thermosetting synthetic materials, including thermoplastic olefins such as polyethylene and polypropylene, thermoplastic urethane, polycarbonate, thermosetting sheet molding compound, reaction-injection molding compound, acrylonitrile-based materials, nylon, any of which may be modified with polybutadiene and other rubbers, and the like. By "composite" is meant any substrate comprising a resinous matrix such as one or more of polypropylene, polybutylene terephthalate, polystyrene, polyaniline, polypyrrole, polyepoxide, poly(methyl methacrylate), polyurethane, and polycarbonate, reinforced with fibers typically oriented as strands, multi-ply yarns, woven sheets, or braids, and comprising at least one of stainless steel fibers, copper fibers, nickel fibers, silver fibers, aluminum fibers, glass fibers, and carbon fibers. The film-forming composition is applied to at least one surface of the substrate. A substrate may have one continuous surface, or two or more surfaces such as two opposing surfaces.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 0.1-1 mils (2.5-25.4 microns), often 0.2-0.4 mils (5-10 microns).

The film-forming compositions can be applied directly to the surface of a substrate to form a coated substrate or onto or under a primer coat or other coating as an adhesion promoter. They are also useful as service primers; i. e., a primer applied to an automotive body part that is sold to an automotive refinish/repair shop for subsequent painting. When used as a service primer, the coating layer typically has a dry film thickness of 0.1 to 1.5 mils (2.5 to 38.1 microns), such as 0.8 to 1.5 mils (20.3 to 38.1 microns).

While it is not necessary, the coated substrate may be subjected to a temperature for a time sufficient to cure the film-forming composition, particularly when the hydroxyl functional (meth)acrylic and/or polyester polymer is present and/or when the polyolefin polymer A) contains reactive functional groups that may react with the aminoplast B) as discussed above. Cure temperatures and durations include those discussed below.

Multiple coating layers such as a colored base coat, a monocoat that may or may not be colored, and/or a clear coat may be applied to the coated substrate as subsequent curable film-forming compositions after application of the film-forming composition of the present invention. Thus these layers may comprise multiple, different coatings serving different purposes.

After applying the subsequent, curable film-forming composition(s) on the coated substrate to form a multi-layer coated substrate, the multi-layer coated substrate can be subjected to a temperature for a time sufficient to cure at least the subsequent film-forming composition(s); for example, by allowing it to stand at ambient temperature, or a combination of ambient temperature cure and baking, or by baking alone. Ambient temperature usually ranges from 60 to 90° F. (15.6 to 32.2° C.), such as a typical room temperature, 72° F. (22.2° C.). The composition of the present invention may be cured at ambient temperature typically in a period ranging from about 24 hours to about 36 hours. If ambient temperature and baking are utilized in combination, the coated substrate is often allowed to stand ("flash") for a period of from about 2 minutes to about 120 minutes at a temperature ranging from ambient to 175° F. (79.4° C.), followed by baking at a temperature up to about 275° F. (135° C.), usually 180° F. (82° C.) or 250° F. (176° C.) for a period of time ranging from about 20 minutes to about 1.5 hour. A heated cure of the film-forming composition of the present invention is particularly useful when it is used as a service primer, although the composition does not need to cure; an ambient flash is often sufficient. For plastic substrates that are heat-sensitive and may deform at high temperatures, the curable film-forming compositions may be curable at temperatures from ambient to 90° C., such as from ambient to 80° C.

After application of the subsequent curable film-forming composition(s) to the coated substrate and upon curing, the coated article demonstrates fuel resistance, measured as demonstrated in the Examples below.

The methods of the present invention are particularly suitable for the improving fuel resistance on a component of a vehicle. Such vehicles may include landcraft such as cars, trucks, sport utility vehicles (SUVs), all terrain vehicles (ATVs), and motorcycles; watercraft such as boats, ships and submarines; aircraft such as airplanes and helicopters; construction vehicles; and military vehicles, for example tanks and Humvees.

The methods of the present invention are also suitable for improving fuel resistance on a component of an autonomous vehicle. Many vehicles in use today, including autonomous vehicles, utilize transmitters and sensors to send and receive signals for various purposes. It is vital for the continued accurate and safe operation of such vehicles that these signals, which are typically electromagnetic radiation in the form of radio waves, do not get impeded in any way. Coated substrates covering the transmitters and sensors must allow for transmission of the signals therethrough. Improving fuel resistance by using the methods of the present invention is particularly beneficial.

Each of the embodiments and characteristics described above, and combinations thereof, may be said to be encompassed by the present invention. For example, the present invention is thus drawn to the following nonlimiting aspects:

1. A film-forming composition comprising:
   A) a non-chlorinated, linear polyolefin polymer comprising 0.5 to 10 percent by weight residues of an ethylenically unsaturated anhydride or acid, based on the total weight of the linear polyolefin polymer;
   B) an aminoplast;
   C) a component comprising:
      i) at least one non-chlorinated hydrocarbon having at least 18 carbon atoms and which may include aromatic groups and/or oxygen heteroatoms, having a number average molecular weight of 200 to 2500; and/or
      ii) an alkyd resin that is different from the component C) i).
2. The composition according to aspect 1 wherein the linear polyolefin polymer A) is dispersed with a polyepoxide and a monohydric alcohol in an organic medium.
3. The composition according to aspect 2 wherein the monohydric alcohol comprises n-propanol, isopropanol, n-butanol, and/or isobutanol.
4. The composition according to any of aspects 1 to 3 wherein the linear polyolefin polymer A) is further reacted with a polyepoxide and a monohydric alcohol.
5. The composition according to aspect 4 wherein the monohydric alcohol comprises n-propanol, isopropanol, n-butanol, and/or isobutanol.
6. The composition according to any of aspects 1 to 5 wherein the linear polyolefin polymer A) further comprises residues of an ethylenically unsaturated monomer comprising at least one (meth)acrylic monomer.
7. The composition according to any of aspects 1 to 6 wherein the aminoplast is at least partially alkylated and wherein 10 to 35 percent of functional groups on the aminoplast comprise imino groups.
8. The composition according to any of aspects 1 to 7 wherein the component C) comprises the non-chlorinated hydrocarbon i), which in turn comprises:
   a) an addition polymer prepared from 1) coumarone and/or indene, and 2) at least one of styrene, alphamethyl styrene, m-methyl styrene, and p-methyl styrene;
   b) a hydroxyl functional, branched polyolefin polymer;
   c) a polyterpene polymer; and/or
   d) a fatty acid oil.
9. The composition according to any of aspects 1 to 8, wherein the component C) comprises the alkyd resin ii).
10. The composition according to any of aspects 1 to 9, further comprising a colorant such as carbon black and/or $TiO_2$.
11. The composition according to any of aspects 1 to 10, further comprising a hydroxyl functional (meth)acrylic polymer, a hydroxyl functional polyester polymer, an acid functional (meth)acrylic polymer, and/or an acid functional polyester polymer.
12. A method of improving fuel resistance of a coated article, comprising:
   (1) applying a first film-forming composition to at least a portion of a substrate to form a coated substrate, wherein the first film-forming composition comprises the composition according to any of aspects 1 to 11;
   (2) optionally subjecting the coated substrate formed in step (1) to a temperature for a time sufficient to cure the film-forming composition;
   (3) applying at least one curable film-forming composition to at least a portion of the coated substrate formed in step (1) to form a multi-layer coated substrate; and
   (4) subjecting the multi-layer coated substrate formed in step (3) to a temperature for a time sufficient to cure all of the curable film-forming compositions; wherein the substrate comprises an elastomeric, plastic, or composite material.
13. The method according to aspect 12 wherein the multi-layer coated substrate is heated to a temperature up to 135° C. in step (4).
14. The use of the composition according to any of aspects 1 to 11 to improve fuel resistance of a coated article.

EXAMPLES

The following examples are intended to illustrate various embodiments of the invention, and should not be construed as limiting the invention in any way.

The following working examples are intended to further describe the invention. It is understood that the invention described in this specification is not necessarily limited to the examples described in this section. Note that for all measurements, the IR spectrometer used was a ThermoScientific Nicolet iS5 FT-IR. Acid number was determined via titration using a Metrohm 888 Titrando and a homogeneous sample solution of tetrahydrofuran (THF) with methanolic potassium hydroxide solution (0.1 N).

Example A: Preparation of Alkyd Resin Solution

An Alkyd resin solution was prepared from the following charges:

| Ingredients | Parts by weight (g) |
|---|---|
| Charge #1 | |
| NOURACID ® SE45[1] | 1126.2 |
| Crotonic acid[2] | 299.2 |

-continued

| Ingredients | Parts by weight (g) |
|---|---|
| Pentaerythritol[3] | 502.8 |
| Phthalic anhydride[4] | 422.4 |
| DBTO[5] | 4.18 |
| Charge #2 | |
| Xylene | 46.2 |
| Charge #3 | |
| Xylene | 968.9 |

[1]NOURACID SE 45 is soybean oil fatty acid and commercially available from Oleon.
[2]Crotonic acid is commercially available from Clariant Corporation.
[3]Pentaerythritol is commercially available from Clariant Corporation.
[4]Phthalic anhydride is commercially available from BASF.
[5]DBTO is dibutyl tin oxide and commercially available from Arkema Inc.

Charge 1 was added to a 5 L 4-necked flask equipped with a motor driven stainless steel stir blade, glycol recovery column, a water-cooled condenser, and a heating mantle with a thermometer connected through a temperature feedback control. The reactor contents were heated to 215° C. and water removed until the acid value was 28~30 mg KOH/g. Then, the glycol recovery column was replaced with a Dean-Stark trap filled with xylene and charge 2 was added into reaction vessel. Water was azeotropically removed until the acid value was less than 10.0 mg KOH/g. The resulting alkyd resin was diluted with charge 3 to afford a solution with solid weight percent of 70% measured for one hour at 110° C., an acid value of 4 to 9 mg KOH/g, and a Gardner viscosity of E to G.

Example B: Preparation of Alkyd Acrylic Resin in Xylene Solution

An Alkyd acrylic resin in xylene solution was prepared from the following charges:

| Ingredients | Parts by weight |
|---|---|
| Charge #1 | |
| Xylene | 50.82 |
| T-Butyl perbenzoate[1] | 17.64 |
| Charge #2 | |
| Example A (Alkyd resin solution) | 2736.09 |
| Styrene | 845.67 |
| Methyl methacrylate | 423.99 |
| 2-Ethylhexyl acrylate | 139.23 |
| Acrylonitrile | 157.29 |
| Charge #3 | |
| Xylene | 1170.12 |
| Charge #4 | |
| Xylene | 273.21 |
| T-Butyl perbenzoate | 9.03 |
| Charge #5 | |
| Xylene | 1095.0 |
| Charge #6 | |
| Xylene | 295.0 |

[1]T-Butyl perbenzoate is commercially available from Akzo Nobel Chemicals.

A 12 liter, 4-necked flask equipped with a motor driven stainless steel stir blade, additional funnel, thermocouple, condenser, and a nitrogen blanket was charged with charge 1, 2, and 3. The reactor contents were heated to 125° C. slowly. External reactor cooling was applied when the reactor contents temperature reached 110° C. to control the resulting exotherm to less than 130° C. The reactor contents were stirred for one hours at 124~127° C. Then charge 4 was added over 180 minutes, the additional funnel rinsed with charge 5 and the reactor contents stirred for another 90 minutes. Then the reactor contents were cooled to 115° C. and 14 inches of vacuum was applied to distill 1482 g solvent. Charge 5 and 6 were added to the reactor to afford a product with 55.8 weight percent solid content (measured for one hour at 110° C.), an acid value of 2 to 5 KOH/g, a Gardner viscosity of U to W, and free acrylonitrile content of less than 50 ppm.

Example C: Preparation of Alkyd Acrylic Resin in AROMATIC 100 Solution

An Alkyd acrylic resin in AROMATIC 100 solution was prepared from the following charges:

| Ingredients | Parts by weight |
|---|---|
| Charge #1 | |
| Example B (Alkyd Acrylic resin in xylene solution) | 2940.0 |
| Charge #2 | |
| AROMATIC 100 | 1309.9 |

Charge 1 was added to a 5 L 4-necked flask equipped with a motor driven stainless steel stir blade, a condenser with distillation adaptors, a nitrogen blanket, and a heating mantle with a thermometer connected through a temperature feedback control device. The mixture was heated to 145° C. and vacuum was applied to distill 1286 g solvent. When distillation was completed, the vacuum and heat were off. Charge 2 was added through additional funnel over 20 minutes to afford a product with 56.11 weight percent solid content (measured for one hour at 110° C.), and a Gardner viscosity of Z.

Example D: Preparation of Polyolefin Solution

A polyolefin solution was prepared from the following charges:

| Ingredients | Parts by weight (g) |
|---|---|
| Charge #1 | |
| AROMATIC 100 | 2313.70 |
| Charge #2 | |
| EPONEX 1510[1] | 3.08 |
| AROMATIC 100 | 24.95 |
| Charge #3 | |
| TOYOBO PMA-KE[2] | 496.92 |
| Charge #4 | |
| Cyclohexane | 696.82 |
| Charge #5 | |
| Cyclohexane | 226.30 |
| Isopropanol | 84.61 |

[1]EPONEX 1510 is a diepoxide and commercially available from Hexion Specialty Chemicals.
[2]TOYOBO PMA-KE is an anhydride functional polyolefin and commercially available from Toyobo.

Charge 1 was added to a 5 L 4-necked flask equipped with a motor driven stainless steel stir blade, a water-cooled condenser, a nitrogen blanket, and a heating mantle with a thermometer connected through a temperature feedback control device. The mixture was heated to 40° C. At 40° C., charge 2 was added and held for 15 minutes followed by addition of Charge 3. The mixture was heated to 80° C. and held at 80° C. until beads were dissolved. The mixture was cooled to 60° C. At 60° C., charge 4 was added into mixture and held until it incorporated. Charge 5 was premixed and added into the mixture and held until it incorporated. The product was poured out through 5-micron nylon mesh filter bag. The solids content of the polyolefin dispersion was 13.5%.

Example E: Preparation of Coumarone Resin Solution

A Coumarone resin solution was prepared from the following charges:

| Ingredients | Parts by weight |
|---|---|
| Charge #1 | |
| Coumarone V-120S[1] | 2018.00 |
| AROMATIC 100 | 1009.00 |
| Cyclohexane | 1009.00 |

[1]Coumarone V-120S is commercially available from Nitto Chemical.

Charge 1 was added to a 12 L 4-necked flask equipped with a motor driven stainless steel stir blade, a water-cooled condenser, a nitrogen blanket, and a heating mantle with a thermometer connected through a temperature feedback control device. The mixture was heated to 40° C. and held at 40° C. for 1 hour. Then mixture was heat to 60° C. and held until it incorporated. The product was cooled to 40° C. poured out through 5-micron nylon mesh filter bag. The solids content of polyolefin dispersion was 53.9%.

Example F: Preparation of Polyolefin Solution

A polyolefin solution was prepared from the following charges:

| Ingredients | Parts by weight (g) |
|---|---|
| Charge #1 | |
| AROMATIC 100 | 2313.70 |
| Charge #2 | |
| EPONEX 1510[1] | 3.08 |
| AROMATIC 100 | 24.95 |
| Charge #3 | |
| TOYOBO PMA-LE[2] | 496.92 |
| Charge #4 | |
| Cyclohexane | 696.82 |
| Charge #5 | |
| Cyclohexane | 226.30 |
| Isopropanol | 84.61 |

[1]Eponex 1510 is commercially available from Hexion Specialty Chemicals.
[2]Toyobo PMA-LE is an anhydride functional polyolefin and commercially available from Toyobo.

Charge 1 was added to a 5 L 4-necked flask equipped with a motor driven stainless steel stir blade, a water-cooled condenser, a nitrogen blanket, and a heating mantle with a thermometer connected through a temperature feedback control device. The mixture was heated to 40° C. At 40° C., charge 2 was added and held for 15 minutes followed by addition of Charge 3. The mixture was heated to 80° C. and held at 80° C. until beads were dissolved. The mixture was cooled to 60° C. At 60° C., charge 4 was added into the mixture and held until it incorporated. Charge 5 was premixed and added into the mixture and held until it incorporated. The product was poured out through 5-micron nylon mesh filter bag. The solids content of polyolefin dispersion was 13.2%.

Example G: Preparation of Polyester Modified Polyolefin

A polyester modified polyolefin solution was prepared from the following charges:

| Ingredients | Parts by weight |
|---|---|
| Charge #1 | |
| TOYOBO PMA-LE[1] | 200.00 |
| AROMATIC 150 | 600.00 |
| Butyl Acetate | 150.00 |
| Charge #2 | |
| EPONEX 1510[2] | 75.40 |
| AROMATIC 150 | 20.00 |
| Charge #3 | |
| Butanol | 71.23 |
| Charge #4 | |
| ARMEEN DMCD[3] | 1.83 |
| AROMATIC 150 | 1.49 |
| Charge #5 | |
| Cyclohexane | 248.60 |

[1]TOYOBO PMA-LE is an anhydride functional polyolefin and commercially available from Toyobo.
[2]EPONEX 1510 is commercially available from Hexion Specialty Chemicals.
[3]ARMEEN DMCD (0.5%) is dimethyl cocoamine and commercially available from Akzo Nobel Chemicals.

Charge 1 was added to a 2 L 4-necked flask equipped with a motor driven stainless steel stir blade, a water-cooled condenser, a nitrogen blanket, and a heating mantle with a thermometer connected through a temperature feedback control device. The reaction mixture was heated to 100° C. At 100° C., charge 2 was added and held for 15 minutes. After holding, charge 3 was added and held for 15 minutes. The reaction mixture was stirred at 100° C. until anhydride peaks were gone as measured by IR. Charge 4 was added into reaction mixture and held at 100° C. until acid value is less than 4. The reaction product was cooled to 60° C. by adding charge #5 and poured out through 5-micron nylon mesh filter bag. The solids content of polyolefin resin was 21.18%.

Example H: Preparation of Higher Solid Polyolefin Solution

A higher solid polyolefin solution was prepared from the following charges:

| Ingredients | Parts by weight (g) |
|---|---|
| Charge #1 | |
| Butyl acetate | 293.20 |
| Charge #2 | |
| EPONEX 1510[1] | 1.54 |
| Butyl acetate | 4.97 |
| Charge #3 | |
| TOYOBO PMA-LE[2] | 248.46 |
| Charge #4 | |
| Cyclohexane | 496.92 |
| Charge #5 | |
| Cyclohexane | 198.80 |
| Isopropanol | 42.31 |

[1]EPONEX 1510 is commercially available from Hexion Specialty Chemicals.
[2]TOYOBO PMA-LE is an anhydride functional polyolefin and commercially available from Toyobo.

Charge 1 was added to a 2 L 4-necked flask equipped with a motor driven stainless steel stir blade, a water-cooled condenser, a nitrogen blanket, and a heating mantle with a thermometer connected through a temperature feedback control device. The mixture was heated to 40° C. At 40° C., charge 2 was added and held for 15 minutes followed by addition of Charge 3. The mixture was heated to 80° C. and held at 80° C. until beads were dissolved. The mixture was cooled to 60° C. At 60° C., charge 4 was added into mixture and held until it incorporated. Charge 5 was premixed and added into mixture and held until it incorporated. The product was poured out through 5-micron nylon mesh filter bag. The solids content of polyolefin dispersion was 19.3%.

Example I: Preparation of an Anhydride and Acrylic Modified Polyolefin Solution An anhydride and acrylic modified polyolefin solution was prepared from the following charges:

| Ingredients | Parts by weight (g) |
|---|---|
| Charge #1 | |
| AROMATIC 100 | 462.70 |
| Charge #2 | |
| EPONEX 1510[1] | 0.62 |
| AROMATIC 100 | 4.99 |
| Charge #3 | |
| AUROREN S-5297S[2] | 99.38 |
| Charge #4 | |
| Cyclohexane | 139.36 |
| Charge #5 | |
| Cyclohexane | 45.30 |
| Isopropanol | 16.92 |

[1]EPONEX 1510 is commercially available from Hexion Specialty Chemicals.
[2]AUROREN S-5297S is an anhydride and acrylic modified polyolefin and commercially available from Nippon Paper Group.

Charge 1 was added to a 1 L 4-necked flask equipped with a motor driven stainless steel stir blade, a water-cooled condenser, a nitrogen blanket, and a heating mantle with a thermometer connected through a temperature feedback control device. The mixture was heated to 40° C. At 40° C., charge 2 was added and held for 15 minutes followed by addition of Charge 3. The mixture was heated to 80° C. and held at 80° C. until beads were dissolved. The mixture was cooled to 60° C. At 60° C., charge 4 was added into mixture and held until it incorporated. Charge 5 was premixed and added into mixture and held until it incorporated. The product was poured out through 5-micron nylon mesh filter bag. The solids content of polyolefin dispersion was 13.7%.

Example J: Preparation of Acrylic Resin

An acrylic resin was prepared in a 300 mL continuous stir tank reactor (CSTR) system from the components listed in the table below.

| Ingredients | Parts by weight (g) |
|---|---|
| Charge #1 | |
| Hydroxypropyl acrylate[1] | 2320.0 |
| Styrene | 1160.0 |
| Butyl acrylate | 1102.0 |
| Butyl methacrylate | 1073.0 |
| Acrylic acid | 116.0 |
| Methyl methacrylate | 29.0 |
| Di-t-amyl peroxide[1] | 58.0 |
| Charge #2 | |
| Di-t-amyl peroxide | 58.0 |

[1]Hydroxypropyl acrylate is commercially available from BASF.
[2]Di-t-amyl peroxide is commercially available from Arkema INC.

The CSTR was charged with 300 mL of Dowanol PM. The charge 1 were weighed and stirred for 15 minutes at an agitation rate sufficient to provide good mixing, then charged to a feed tank while the reactor system was heating up to the reaction temperature (226° C.). Collection of the resulting acrylic resin was begun 15 minutes after the feed was started and continued for 25 minutes. The neat resin was continuously transferred to flash tank where charge 2 was added as a chaser initiator. The flash tank was maintained under pressure at the temperature around 195° C. (not exceed to 200° C.). The resulting material was thinned with a solvent mixture of aromatic 100 and Dowanol PM acetate (weight ratio is 40:60) to a weight percent solid content of 67% (measured for one hour at 110° C.). The final resin was a viscous liquid with a Mw of 8557, a Mn of 2079, and PDI of 4.1.

The weight average molecular weight was determined by Gel Permeation Chromatography using a Waters 2695 separation module with a Waters 410 differential refractometer (RI detector) and polystyrene standards. Tetrahydrofuran (THF) was used as the eluent at a flow rate of 1 ml $min^{-1}$, and two PL Gel Mixed C columns were used for separation.

Example K: Preparation of Polyterpene Dispersion

A dispersion of WINGTACK 86 was prepared from the following charges:

| Ingredients | Parts by weight |
|---|---|
| Charge #1 | |
| WINGTACK 86 flake[1] | 292.6.00 |
| AROMATIC 100[2] | 1092.7 |
| Cyclohexane | 292.7 |

[1]WINGTACK 86 is commercially available from Cray Valley.
[2]AROMATIC 100 is commercially available from Solvents & Petroleum Service, Inc.

Charge 1 was added to a 3 L 4-necked flask equipped with a motor driven stainless steel stir blade, a water-cooled condenser, a nitrogen blanket, and a heating mantle with a thermometer connected through a temperature feedback control device. The mixture was heated to 40° C. and held at 40° C. for 1 hour. Then the mixture was heated to 60° C. and held until homogeneous. The product was cooled to 40° C. and poured out through a 5-micron nylon mesh filter bag. The solids content of the dispersion was 65.9%.

Example L: Preparation of Aromatic Hydrocarbon Dispersion

A dispersion of NOVARES TN 150 resin was prepared from the following charges:

| Ingredients | Parts by weight |
|---|---|
| Charge #1 | |
| NOVARES TN150[1] | 1000.0 |
| AROMATIC 100 | 325.0 |
| Cyclohexane | 325.0 |

[1]NOVARES TN 150 is commercially available from Rutgers Chemicals.

Charge 1 was added to a 3 L 4-necked flask equipped with a motor driven stainless steel stir blade, a water-cooled condenser, a nitrogen blanket, and a heating mantle with a thermometer connected through a temperature feedback control device. The mixture was heated to 40° C. and held at 40° C. for 1 hour. Then the mixture was heated to 60° C. and held until homogeneous. The product was cooled to 40° C. poured out through a 5-micron nylon mesh filter bag. The solids content of the dispersion was 60.7%.

Example M: Preparation of Branched Polyester

A branched polyester resin solution was prepared from the following charges:

| Ingredients | Parts by weight |
|---|---|
| Charge #1 | |
| Pentaerythritol | 952.0 |
| Methylhexahydrophthalic Anhydride | 940.8 |
| n-Butylstannoic acid | 3.1 |
| triphenylphosphite | 3.1 |
| Charge #2 | |
| Isononanoic acid | 1327.2 |
| Charge #3 | |
| Butyl Acetate | 1039.7 |

The polyester polymer was prepared in a four-neck round bottom flask equipped with a thermometer, mechanical stirrer, condenser, dry nitrogen sparge and a heating mantle. The charges 1 and 2 were added into the reactor and heated to a temperature of 260° C., and stirred in the flask until about 363 grams of distillate was collected. Switched to a small Dean stark when the acid value dropped below 15. Then 100 g toluene was added to continue remove water through azeotrope. When AV measured less than 5, the reaction mixture was cooled to 160° C. and full vacuum applied for 30 minutes. Then the reaction mixture was continued to cool to 100° C. and Charge 3 added. The final product was a liquid having a non-volatile content of 73.9% (as measured at 110° C. for one hour), and hydroxyl value of 151, a weight average molecular weight of 6608 as measured by gel permeation chromatography, and an acid value less than 5.

Film Forming Compositions:

Unpigmented Adhesion Promoters:

Compositions for Examples 1 and 2 according to the present invention are listed below in Table 1. The amounts listed are the total parts by weight in grams. Each component was mixed sequentially with agitation.

TABLE 1

| Ingredient | Parts by weight of Component Example 1 | Example 2 |
|---|---|---|
| SOLVESSO 100[1] | 160.39 | 160.39 |
| HARDLEN PMA-KE PO[2] | 238.10 | 238.10 |
| Alkyd acrylic resin[3] | 107.46 | — |
| Coumarone V120S[4] | — | 117.24 |
| KRATON G1726X Thermoplastic rubber[5] | 22.44 | 22.44 |
| Cyclohexane[6] | 160.39 | 160.39 |
| CYMEL 1158[7] | 14.59 | 14.59 |
| Isopropyl alcohol[8] | 20.69 | 20.69 |
| DC200 Silicone Solution[9] | 0.04 | 0.04 |
| CYCAT 600[10] | 2.06 | 2.06 |
| Phenyl acid phosphate[11] | 0.11 | 0.11 |
| EFKA PL 5651 NF[12] | 1.08 | 1.08 |
| Total | 727.34 | 737.13 |

[1]Solvent commercially from Exxon Mobil Corporation.
[2]Synthesis example D
[3]Alkyd acrylic resin: Synthesis example C
[4]Synthesis example E
[5]Resin solution containing 25% KRATON G1726X, commercially available from Kraton Polymers, AND 75% SOLVESSO 100, available from Exxon Mobil Corporation.
[6]Solvent commercially available from Brenntag.
[7]High-imino melamine commercially available from Allnex.
[8]Solvent commercially available from Dow Chemical.
[9]Additive solution containing ANDISIL SF100 commercially available from AB Specialty Silicones LLC.
[10]Catalyst commercially available from Allnex.
[11]Catalyst commercially available from Islechem LLC.
[12]Additive commercially available from BASF.

Pigmented Adhesion Promoters:

Compositions for Pigment Pastes 1-4 are listed below in Table 2. The amounts listed are the total parts by weight in grams. Ingredients of the grind except the methyl n-amyl ketone are added sequentially together and mixed with a Cowles blade before entering the mill. A mill is used to grind the mixture to a Hegman of 7.25. The methyl n-amyl ketone is added at the end as a mill wash.

TABLE 2

| Ingredient | Parts by weight of Component Pigment Paste 1 | Pigment Paste 2 | Pigment Paste 3 | Pigment Paste 4 |
|---|---|---|---|---|
| SOLVESSO 100[1] | 46.42 | 46.42 | 27.66 | 26.48 |
| SOLVESSO 150[1] | 8.77 | 8.77 | 5.23 | 8.77 |
| Alkyd acrylic resin[3] | 58.17 | 58.17 | — | 58.17 |
| Coumarone V120S[4] | — | — | 60.55 | — |
| KRATON G1726X Thermoplastic rubber[5] | 22.44 | 22.44 | 22.44 | 22.44 |
| PRINTEX XE 2-B[13] | 7.67 | 7.67 | 7.67 | 7.67 |
| VM&P Naptha[14] | 34.98 | 34.98 | 20.85 | 34.98 |

TABLE 2-continued

| Ingredient | Parts by weight of Component Pigment Paste 1 | Pigment Paste 2 | Pigment Paste 3 | Pigment Paste 4 |
|---|---|---|---|---|
| White tint[15] | 126.78 | 25.78 | 25.78 | 126.78 |
| Methyl N-amyl ketone[16] | 36.04 | 36.04 | — | 36.04 |
| Total | 341.27 | 240.25 | 170.17 | 321.34 |

[1]Solvent commercially from Exxon Mobil Corporation.
[3]Alkyd acrylic resin: Synthesis example C
[4]Synthesis example E
[5]Resin solution containing 25% KRATON G1726X, commercially available from Kraton Polymers, AND 75% SOLVESSO 100, available from Exxon Mobil Corporation.
[13]Carbon black available from Orion Engineered Carbons.
[14]Solvent available from Ashland Inc.
[15]Titanium dioxide pigment paste dispersion of 64.25% titanium dioxide pigment available from The Chemours Company LLC, 11.24% alkyd (Synthesis example B), 23.53% SOLVESSO 100 (available from Exxon Mobil Corporation) and 0.98% xylene.
[16]Solvent available from Dow Chemical Co.

The Pigment Pastes 1-4 were used in Examples 3-11. Compositions for Examples 3-11 are listed below in Tables 3-4. (Note that Example 8 is comparative; the composition does not contain an aminoplast.) The amounts listed are the total parts by weight in grams. Each component was mixed sequentially with agitation.

TABLE 3

| Ingredient | Parts by weight of Component Example 3 | Example 4 | Example 5 | Example 6 |
|---|---|---|---|---|
| Pigment Paste 1 | 341.27 | — | — | — |
| Pigment Paste 2 | — | 240.25 | — | — |
| Pigment Paste 3 | — | — | 170.17 | — |
| Pigment Paste 4 | — | — | — | 321.34 |
| TOYO-TAC PMA-KE PO[2] | 238.10 | — | — | — |
| TOYO-TAC PMA-LE PO[17] | — | 151.17 | 151.17 | — |
| Modified PMA-LE PO[18] | — | — | — | 97.23 |
| White tint[15] | — | 101.01 | 101.01 | — |
| SOLVESSO 100[1] | 87.68 | 87.68 | 87.68 | 107.62 |
| Cyclohexane[6] | 87.68 | 87.68 | 87.68 | 87.68 |
| Coumarone V120S[4] | 25.28 | 45.28 | 45.28 | 42 |
| CYMEL 1158[7] | 14.59 | 14.59 | 14.59 | 14.59 |
| Isopropyl alcohol[8] | 20.69 | 20.69 | 20.69 | 20.69 |
| DC200 Silicone Solution[9] | 0.04 | 0.04 | 0.04 | 0.04 |
| CYCAT 600[10] | 2.06 | 2.06 | 2.06 | 2.06 |
| Phenyl acid phosphate[11] | 0.11 | 0.11 | 0.11 | 0.11 |
| EFKA PL 5651 NF[12] | 1.08 | 1.08 | 1.08 | 1.08 |
| Total | 700.72 | 751.64 | 681.56 | 694.43 |

TABLE 4

| Ingredient | Parts by weight of Component Example 7 | Example 8 (Comparative) | Example 9 | Example 10 | Example 11 |
|---|---|---|---|---|---|
| Pigment Paste 4 | 321.34 | 321.34 | 321.34 | 321.34 | 321.34 |
| TOYO-TAC PMA-LE PO[19] | 103.52 | 103.52 | 103.52 | — | — |
| AUROREN S-5297S[20] | — | — | — | 145.56 | 145.56 |
| SOLVESSO 100[1] | 107.62 | 107.62 | 107.62 | 107.62 | 107.62 |
| Cyclohexane[6] | 87.68 | 87.68 | 87.68 | 87.68 | 87.68 |
| Coumarone V120S[4] | 42 | 63.12 | 38.29 | 42 | — |
| Acrylic resin[21] | — | — | 12.45 | — | — |
| Alkyd acrylic[3] | — | — | — | — | 41.5 |
| CYMEL 1158[7] | 14.59 | — | 6.41 | 14.59 | 14.59 |
| Isopropyl alcohol[8] | 20.69 | 20.69 | 20.69 | 20.69 | 20.69 |
| DC200 Silicone Solution[9] | 0.04 | 0.04 | 0.04 | 0.04 | 0.04 |
| CYCAT 600[10] | 2.06 | 2.06 | 2.06 | 2.06 | 2.06 |
| Phenyl acid phosphate[11] | 0.11 | 0.11 | 0.11 | 0.11 | 0.11 |
| EFKA PL 5651 NF[12] | 1.08 | 1.08 | 1.08 | 1.08 | 1.08 |
| Total | 700.72 | 707.25 | 701.29 | 742.76 | 742.26 |

[1]Solvent commercially from Exxon Mobil Corporation.
[2]Synthesis example D
[3]Synthesis example C
[4]Synthesis example E
[6]Solvent commercially available from Brenntag.
[7]Melamine commercially available from Allnex.
[8]Solvent commercially available from Dow Chemical.
[9]Additive solution containing ANDISIL SF100 commercially available from AB Specialty Silicones LLC.
[10]Catalyst commercially available from Allnex.
[11]Catalyst commercially available from Islechem LLC.
[12]Additive commercially available from BASF.
[15]Titanium dioxide pigment paste dispersion of 64.25% titanium dioxide pigment available from The Chemours Company LLC, 11.24% alkyd (Synthesis example B), 23.53% SOLVESSO 100 (available from Exxon Mobil Corporation) and 0.98% xylene.
[17]Synthesis example F
[18]Synthesis example G
[19]Synthesis example H
[20]Synthesis example I
[21]Synthesis example J Coatings were applied to Lyondell Basell Hifax TRC779X (4"×12"×0.118") thermoplastic olefin (TPO) panels, available from Standard Plaque Inc.

For Examples 1-5, LBC408YB, an orange metallic solventborne basecoat and TKU2000CS 2K isocyanate clearcoat, both available from PPG, were applied over the adhesion promoters. Adhesion promoter, basecoat and clearcoat were applied wet-on-wet-on-wet via hand spray application targeting dry film thicknesses of 5-10, 16-20 and 38-46 microns respectively. All flashes between coating layers and before the cure oven were untimed at ambient conditions. The system was baked for 35 minutes at 180° F. (82° C.) in a horizontal position.

For Examples 6-11, LBC8555B, a black pigmented solventborne basecoat and TKU2000CS 2K isocyanate clearcoat, both available from PPG, were applied over the adhesion promoters. Adhesion promoter, basecoat and clearcoat were applied wet-on-wet-on-wet via automated spray applied targeting dry film thicknesses of 5-10, 16-20 and 38-46 microns respectively. Adhesion promoter was applied in one coat with a 4-minute ambient flash before basecoat application. The basecoat was applied in two coats with 60-second ambient flash between coats and a 4-minute ambient flash before clearcoat. Clearcoat was sprayed in 2 coats with a 60-second ambient flash between coats and a 7-minute ambient flash before entering the cure oven. The system was baked for 35 minutes at 180° F. (82° C.) in a vertical position. A coating system without adhesion promoter was sprayed as a negative control.

Coated panels were allowed to rest under ambient conditions for at least 3 days before testing. Panels were tested for resistance to delamination in a fuel soak test. Results follow in Table 5.

TABLE 5

| Adhesion Promoter | Fuel Resistance[22] (minutes) |
|---|---|
| Example 1 | 32 |
| Example 2 | 29 |
| Example 3 | 60 |
| Example 4 | 60 |
| Example 5 | 32 |
| Example 6 | 60 |
| Example 7 | 60 |
| Example 8 | 7 |
| Example 9 | 60 |
| Example 10 | 60 |
| Example 11 | 60 |
| None | 2 |

[22]Coated panels were cut into three 1" × 4" pieces for each coating system to be tested for fuel resistance. Cut edges were covered using Nichiban LP-24 tape available from Alliance Rubber Co. An "X" was cut into the coating layers on one end of each panel and that end was submersed in a synthetic fuel blend (formulation in Table 6). Panels were timed from the time they were submerged in the fuel until the time the coating started to lift from the "X." The time at which the coating lifted from the substrate was recorded as the time to fail. The times to fail for the three panels for each coating system were averaged, rounded to the nearest whole value and listed as Fuel Resistance; higher times indicate better fuel resistance. Test specifications for a "pass" rating require at least 15 minutes in the fuel soak before lifting of the coating from the substrate is observed.

TABLE 6

Synthetic Fuel formulation

| Ingredient | Parts by weight of Component |
|---|---|
| 2,2,4-trimethylpentane | 25.35 |
| Toluene | 42.25 |
| di-isobutylene | 12.68 |
| Ethanol SDA-3A 200 PROOF | 4.22 |
| Methanol | 15.00 |
| Deionized water | 0.50 |
| Total | 100.00 |

TABLE 7

| | Parts by weight of Component | | |
|---|---|---|---|
| Ingredient | Example 12 | Example 13 | Example 14 |
| Pigment Paste 4 | 321.34 | 321.34 | 321.34 |
| Polyolefin solution of Synthesis example H | 153.85 | 153.85 | 153.85 |
| SOLVESSO 100 | 19.94 | 19.94 | 19.94 |
| Cyclohexane | 50.62 | 50.62 | 50.62 |
| Coumarone resin solution of Synthesis example E | 45.28 | — | 28.00 |
| Acrylic resin of Synthesis example J | — | — | 16.70 |
| Alkyd acrylic solution of synthesis example C | — | 41.50 | — |
| CYMEL 1158[1] | 14.59 | 14.59 | 14.59 |
| Isopropyl alcohol | 20.69 | 20.69 | 20.69 |
| DC200 Silicone Solution[2] | 0.04 | 0.04 | 0.04 |
| CYCAT 600[3] | 2.06 | 2.06 | 2.06 |
| Phenyl acid phosphate | 0.11 | 0.11 | 0.11 |
| EFKA PL 5651 NF[4] | 1.08 | 1.08 | 1.08 |
| Cyclohexane | 70.66 | 70.66 | 70.66 |
| Methyl ethyl ketone | 17.77 | 17.77 | 17.77 |
| Butyl acetate | 29.10 | 29.10 | 29.10 |
| Ethyl acetate | 9.77 | 9.77 | 9.77 |
| Total | 756.88 | 753.11 | 756.30 |

[1]Melamine commercially available from Allnex.

[2]Additive solution containing ANDISIL SF100 commercially available from AB Specialty Silicones LLC.

[3]Catalyst commercially available from Allnex.

[4]Additive commercially available from BASF.

TABLE 8

| | Parts by weight of Component | | | | | |
|---|---|---|---|---|---|---|
| Ingredient | Ex. 15 | Ex. 16 | Ex. 17 | Ex. 18 | Ex. 29 | Ex. 20 |
| Pigment Paste 4 | 321.33 | 321.33 | 321.33 | 321.33 | 321.33 | 321.33 |
| Polyolefin solution of Synthesis example H | 153.85 | 153.85 | 153.85 | 153.85 | 153.85 | 98.50 |
| SOLVESSO 100 | 19.94 | 19.94 | 19.94 | 19.94 | 19.94 | 50.58 |
| Cyclohexane | 50.62 | 50.62 | 50.62 | 50.62 | 50.62 | 138.51 |
| Coumarone resin | — | — | — | — | — | — |

TABLE 8-continued

| | Parts by weight of Component | | | | | |
|---|---|---|---|---|---|---|
| Ingredient | Ex. 15 | Ex. 16 | Ex. 17 | Ex. 18 | Ex. 29 | Ex. 20 |
| solution of Synthesis example E | | | | | | |
| Acrylic resin of Synthesis example J | 12.84 | 12.84 | 12.84 | 12.84 | 12.84 | 12.68 |
| Alkyd acrylic solution of synthesis example C | — | — | — | — | — | 3.87 |
| Dispersion of Synthesis example K | 23.33 | — | | | | |
| Dispersion of Synthesis example L | — | 23.33 | | | | |
| VYBAR H-6164[1] | — | — | 14.00 | — | — | — |
| Castor Oil | — | — | — | 14.00 | — | — |
| Branched Polyester of synthesis example M | — | — | — | — | 18.67 | — |
| Polyester[2] | — | — | — | — | — | 25.27 |
| CYMEL 1158 | 14.59 | 14.59 | 14.59 | 14.59 | 14.59 | 14.50 |
| Isopropyl alcohol | 20.69 | 20.69 | 20.69 | 20.69 | 20.69 | 20.69 |
| DC200 Silicone Solution | 0.04 | 0.04 | 0.04 | 0.04 | 0.04 | 0.04 |
| CYCAT 600 | 2.06 | 2.06 | 2.06 | 2.06 | 2.06 | 2.06 |
| Phenyl acid phosphate | 0.11 | 0.11 | 0.11 | 0.11 | 0.11 | 0.11 |
| EFKA PL 5651 NF | 1.08 | 1.08 | 1.08 | 1.08 | 1.08 | 1.08 |
| Cyclohexane | 70.66 | 70.66 | 70.66 | 70.66 | 70.66 | — |
| Methyl ethyl ketone | 17.77 | 17.77 | 17.77 | 17.77 | 17.77 | — |
| Butyl acetate | 29.10 | 29.10 | 29.10 | 29.10 | 29.10 | 56.46 |
| Ethyl acetate | 9.77 | 9.77 | 9.77 | 9.77 | 9.77 | — |
| Total | 747.77 | 747.77 | 738.44 | 738.44 | 743.11 | 745.68 |

[1]Polymer available from Baker Petrolite Polymers of Baker Hughes.
[2]Polyester resin prepared in accordance with Example C in U.S. Pat. No. 5,859,154

Testing:

Coatings were applied to Lyondell Basell Hifax TRC779X (4"×12"×0.118") thermoplastic olefin (TPO) panels, available from Standard Plaque, Inc.

For Examples 12-14, LBC8624A, a white solventborne basecoat and TKU2000CS 2K isocyanate clearcoat, both available from PPG, were applied over the adhesion promoters. Adhesion promoter was applied via hand spray application, targeting dry film thicknesses of 5-10 microns. Adhesion promoter was allowed to flash untimed in a horizontal position at ambient conditions. Basecoat and clearcoat were applied wet-on-wet via automated spray applied targeting dry film thicknesses of 35-43 and 38-46 microns respectively. The basecoat was applied in 2 coats with 60 second ambient flash between coats and at least a 4 ambient minute flash before clearcoat. Clearcoat was sprayed in 2 coats with a 60 second ambient flash between coats and at least a 7 minute ambient flash before entering the cure oven. The system was baked for 35 minutes at 180° F. (82° C.) in a vertical position.

For Examples 15-20, LBC8624A, a white solventborne basecoat and TKU2000CS 2K isocyanate clearcoat, both available from PPG, were applied over the adhesion promoters. Adhesion promoter, basecoat and clearcoat were applied wet-on-wet-on-wet via automated spray applied targeting dry film thicknesses of 5-10, 30-35 and 40-45 microns respectively. Adhesion promoter was applied in 1 coat with a 4 minute ambient flash before basecoat application. The basecoat was applied in 2 coats with 60 second ambient flash between coats and a 4 ambient minute flash before clearcoat. Clearcoat was sprayed in 2 coats with a 60 second ambient flash between coats and a 7 minute ambient flash before entering the cure oven. The system was baked for 35 minutes at 180° F. (82° C.) in a vertical position.

Coated panels were allowed to rest for at least 3 days before testing. Panels were tested for resistance to delamination in a fuel soak test. Results follow in Tables 9 and 11.

TABLE 9

| Fuel Resistance Method A | |
|---|---|
| Adhesion Promoter | Fuel Resistance[22] (minutes) |
| Example 12 | 33 |
| Example 13 | 18 |
| Example 14 | 27 |

[22]Method A: Coated panels were cut into three 1" x 4" pieces for each coating system to be tested for fuel resistance. Cut edges were covered using Nichiban LP-24 tape available from Alliance Rubber Co. An "X" was cut into the coating layers on one end of each panel and that end was submersed in a synthetic fuel blend A (formulation in Table 10). Panels were timed from the time they were submerged in the fuel until the time the coating started to lift from the "X." The time at which the coating lifted from the substrate was recorded as the time to fail. The times to fail for the three panels for each coating system were averaged, rounded to the nearest whole value and listed as Fuel Resistance. Specification is to pass 15 minutes in fuel soak.

TABLE 10

| Synthetic Fuel Formulation A | |
|---|---|
| Ingredient | Parts by weight of Component |
| 2,2,4-trimethylpentane | 25.35 |
| Toluene | 42.25 |
| di-isobutylene | 12.68 |
| Ethanol SDA-3A 200 PROOF | 4.22 |
| Methanol | 15.00 |
| Deionized water | 0.50 |
| Total | 100.00 |

TABLE 11

| Fuel Resistance Method B | | |
|---|---|---|
| Adhesion | Fuel Resistance[29] (% remaining) | |
| Promoter | @ 15 minutes | @ 1 hour |
| Example 15 | 100 | 90 |
| Example 16 | 100 | 100 |
| Example 17 | 100 | 93 |
| Example 18 | 100 | 100 |
| Example 19 | 90 | 70 |
| Example 20 | 100 | 80 |

[29]Method B: Coated panels were cut into 1.5" × 4" pieces for each coating system to be tested for fuel resistance. Cut edges were covered using Nichiban LP-24 tape available from Alliance Rubber Co. A 10 × 10 grid was cut into the coating layers on one end of each panel using a 3 mm template available from ACT Test Panels LLC. The end with the grid was submersed in a synthetic fuel blend B (formulation in Table 12). Panels were timed from the time they were submerged in the fuel. The submersed end of the panels were inspected at 15 minute intervals up to 1 hour total submersion time. At each of the 15 minute intervals, the number of squares remaining from the 10 × 10 grid were counted and reported as a percentage of squares remaining and reported as Fuel Resistance. Specification is to have 80% of the squares remaining after 15 minutes in fuel soak.

TABLE 12

| Synthetic Fuel Formulation B | |
|---|---|
| Ingredient | Parts by weight of Component |
| 2,2,4-trimethylpentane | 25.35 |
| Toluene | 42.25 |
| di-isobutylene | 12.68 |
| Ethanol SDA-3A 200 PROOF | 4.22 |
| Formic Acid | 0.002 |
| Methanol | 15.00 |
| Deionized water | 0.50 |
| Total | 100.002 |

Panels were tested for accelerated weathering in a Weatherometer (available from ATLAS Material Testing Solutions) following SAE J2527 standard test method. Test panels were measured before testing for CIELAB color using a spectrophotometer such as that available from Datacolor to determine the initial color. Panels were then tested at intervals throughout accelerated weathering to be measured for color development especially yellowing as measured by the b value. To determine the extent of yellowing, the change in the b value from the measurement interval compared to the initial is reported as Δb. Results are tabulated in Table 13.

TABLE 13

| Adhesion | Δb after Weatherometer Exposure | |
|---|---|---|
| Promoter | @ 1000 hours | @ 3000 hours |
| Example 12 | 1.19 | 1.10 |
| Example 13 | −0.11 | −0.07 |
| Example 14 | 1.16 | 1.09 |
| Example 15 | −0.11 | −0.01 |
| Example 16 | 0.44 | 0.40 |
| Example 17 | 0.02 | 0.05 |
| Example 18 | 0.04 | 0.07 |
| Example 19 | −0.01 | Not available |
| Example 20 | −0.04 | Not available |

Whereas particular embodiments of this invention have been described above for purposes of illustration, it will be evident to those skilled in the art that numerous variations of the details of the present invention may be made without departing from the scope of the invention as defined in the appended claims.

Therefore, We claim:

1. A film-forming composition comprising:
A) a non-chlorinated, linear polyolefin polymer comprising 0.5 to 10 percent by weight residues of an ethylenically unsaturated anhydride or acid, based on the total weight of the linear polyolefin polymer;
B) an aminoplast; and
C) a component comprising:
i) at least one non-chlorinated hydrocarbon having at least 18 carbon atoms and which optionally includes aromatic groups and/or oxygen heteroatoms, having a number average molecular weight of 200 to 2500; and/or
ii) an alkyd resin that is different from the component C) i); wherein the linear polyolefin polymer A) is further reacted with a) an isocyanate-functional alkoxysilane, b) a lactone, or c) a lactide.

2. The film-forming composition of claim 1 wherein the linear polyolefin polymer A) is further reacted with the isocyanate-functional alkoxysilane a), and wherein the isocyanate-functional alkoxysilane a) comprises an isocyanatopropyl trimethoxy silane and/or an isocyanatopropyl triethoxy silane.

3. The film-forming composition of claim 1 wherein the linear polyolefin polymer A) further comprises residues of an ethylenically unsaturated monomer comprising at least one (meth)acrylic monomer.

4. The film-forming composition of claim 1 wherein the aminoplast B) is at least partially alkylated and wherein 10 to 35 percent of functional groups on the aminoplast comprise imino groups.

5. The film-forming composition of claim 1 wherein the component C) comprises the non-chlorinated hydrocarbon i), which in turn comprises:
a) an addition polymer prepared from 1) coumarone and/or indene, and 2) at least one of styrene, alphamethyl styrene, m-methyl styrene, and p-methyl styrene;
b) a hydroxyl functional, branched polyolefin polymer;
c) a polyterpene polymer; and/or
d) a fatty acid oil.

6. The film-forming composition of claim 1, wherein the component C) comprises the alkyd resin ii).

7. The film-forming composition of claim 1, further comprising a colorant.

8. The film-forming composition of claim 1, further comprising a hydroxyl functional (meth)acrylic polymer, a hydroxyl functional polyester polymer, an acid functional (meth)acrylic polymer, and/or an acid functional polyester polymer.

9. A film-forming composition comprising:
A) a non-chlorinated, linear polyolefin polymer comprising 0.5 to 10 percent by weight residues of an ethylenically unsaturated anhydride or acid, based on the total weight of the linear polyolefin polymer;
B) an aminoplast; and
C) a component comprising:
i) at least one non-chlorinated hydrocarbon having at least 18 carbon atoms and which optionally includes aromatic groups and/or oxygen heteroatoms, having a number average molecular weight of 200 to 2500; and/or
ii) an alkyd resin that is different from the component C) i); wherein the linear polyolefin polymer A) is dispersed with a diepoxide and a monohydric alcohol comprising isopropanol and/or n-butanol in an organic medium; and wherein the linear polyolefin polymer A) is further reacted with the diepoxide and the monohydric alcohol.

10. The film-forming composition of claim 9 wherein the linear polyolefin polymer A) further comprises residues of an ethylenically unsaturated monomer comprising at least one (meth)acrylic monomer.

11. The film-forming composition of claim 9 wherein the aminoplast B) is at least partially alkylated and wherein 10 to 35 percent of functional groups on the aminoplast comprise imino groups.

12. The film-forming composition of claim 9, wherein the component C) comprises the alkyd resin ii).

13. The film-forming composition of claim 9, further comprising a colorant.

14. The film-forming composition of claim 9, further comprising a hydroxyl functional (meth)acrylic polymer, a hydroxyl functional polyester polymer, an acid functional (meth)acrylic polymer, and/or an acid functional polyester polymer.

15. A film-forming composition comprising:

A) a non-chlorinated, linear polyolefin polymer comprising 0.5 to 10 percent by weight residues of an ethylenically unsaturated anhydride or acid, based on the total weight of the linear polyolefin polymer, and residues of an ethylenically unsaturated monomer comprising at least one (meth)acrylic monomer;

B) an aminoplast; and

C) a component comprising:

i) at least one non-chlorinated hydrocarbon having at least 18 carbon atoms and which optionally includes aromatic groups and/or oxygen heteroatoms, having a number average molecular weight of 200 to 2500; and/or ii) an alkyd resin that is different from the component C) i).

16. The film-forming composition of claim 15 wherein the linear polyolefin polymer A) is dispersed with a polyepoxide and a monohydric alcohol in an organic medium.

17. The film-forming composition of claim 15 wherein the linear polyolefin polymer A) is further reacted with a polyepoxide and a monohydric alcohol.

18. The film-forming composition of claim 15 wherein the aminoplast B) is at least partially alkylated and wherein 10 to 35 percent of functional groups on the aminoplast comprise imino groups.

19. The film-forming composition of claim 15, wherein the component C) comprises the alkyd resin ii).

* * * * *